United States Patent
Klein et al.

(10) Patent No.: US 9,446,307 B2
(45) Date of Patent: *Sep. 20, 2016

(54) DEVICE FOR BALANCE EXERCISES AND BALANCE GAMES USING VARIABLE RESTORING FORCES

(71) Applicant: EXTRALEVEL GBR, Munich (DE)

(72) Inventors: Maximilian Klein, Munich (DE); Peter Lutz, Munich (DE)

(73) Assignee: EXTRALEVEL GbR, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,574

(22) Filed: Feb. 3, 2015

(65) Prior Publication Data

US 2015/0202495 A1    Jul. 23, 2015

Related U.S. Application Data

(63) Continuation of application No. 13/382,923, filed as application No. PCT/EP2010/004279 on Jul. 14, 2010, now Pat. No. 8,979,722.

(30) Foreign Application Priority Data

Jul. 16, 2009 (DE) .................. 10 2009 033 440

(51) Int. Cl.
*A63B 22/14* (2006.01)
*A63F 13/245* (2014.01)
(Continued)

(52) U.S. Cl.
CPC .......... *A63F 13/245* (2014.09); *A63B 22/0015* (2013.01); *A63B 22/18* (2013.01);
(Continued)

(58) Field of Classification Search
CPC .................. A63B 21/00058; A63B 21/00061; A63B 21/00065; A63B 21/00178; A63B 21/00181; A63B 21/00185; A63B 21/02; A63B 21/023; A63B 21/025; A63B 21/028; A63B 21/04; A63B 21/0407; A63B 21/0414; A63B 21/0421; A63B 21/0428; A63B 21/0435; A63B 21/0442; A63B 21/045; A63B 21/0455; A63B 21/05; A63B 21/22; A63B 21/4027; A63B 21/4033; A63B 21/4034; A63B 21/4045; A63B 21/4047; A63B 21/4049; A63B 22/0015; A63B 22/14; A63B 22/16; A63B 22/18; A63B 2023/003; A63B 23/0222; A63B 23/035; A63B 23/03516; A63B 23/03525; A63B 23/04; A63B 23/0405; A63B 23/0482; A63B 23/0488; A63B 23/0494; A63B 23/08; A63B 26/003; A63B 69/0093; A63B 2208/02; A63B 2208/0204; A63B 2220/16; A63B 2220/24; A63B 2220/40; A63B 2220/52; A63B 2220/80; A63B 2220/801; A63B 2220/833

See application file for complete search history.

(56) References Cited

U.S. PATENT DOCUMENTS

| | | | | |
|---|---|---|---|---|
| 478,166 A | * | 7/1892 | Madsen | ................. A63B 23/08 482/146 |
| 735,319 A | * | 8/1903 | Urwick | ............. A63B 22/0058 482/123 |

(Continued)

FOREIGN PATENT DOCUMENTS

| | | | | |
|---|---|---|---|---|
| CA | WO 9606664 A1 | * | 3/1996 | ......... A63B 21/0552 |
| DE | 4004554 A1 | * | 8/1991 | ............ A63B 22/18 |

(Continued)

OTHER PUBLICATIONS

International Search Report issued in PCT Appln. No. PCT/EP2010/004279 dated Feb. 15, 2011.

(Continued)

*Primary Examiner* — Oren Ginsberg
*Assistant Examiner* — Gary D Urbiel Goldner
(74) *Attorney, Agent, or Firm* — Hershkovitz & Associates, PLLC; Abraham Hershkovitz

(57) ABSTRACT

A board apparatus for balance exercises and balance games having a platform that is tiltable on a base part, freely rotatable around a vertical axis, and mounted movably along the vertical axis. A restoring part generates restoring forces that counteract motions of the platform and can be modified by the user. The restoring part includes four elastomer springs that are arranged at a distance from the center of the base part. The elastomer springs can be offset inward or outward with respect to the center of the base part, enabling accurate adaptation of the restoring forces. When twisting the platform around the vertical axis, the restoring part always returns the support part into one of two initial positions that are located 180 degree opposite to one another.

30 Claims, 9 Drawing Sheets

(51) Int. Cl.
  *A63F 13/816* (2014.01)
  *A63F 13/807* (2014.01)
  *A63B 22/00* (2006.01)
  *A63B 22/18* (2006.01)
  *A63B 26/00* (2006.01)
  *G09B 9/04* (2006.01)
  *G09B 9/06* (2006.01)
  *G09B 19/00* (2006.01)
  *A63F 13/20* (2014.01)
  *A63B 21/00* (2006.01)
  *A63B 21/02* (2006.01)
  *A63B 69/00* (2006.01)
  *A63B 24/00* (2006.01)

(52) U.S. Cl.
  CPC ............ *A63B 26/003* (2013.01); *A63F 13/06* (2013.01); *A63F 13/807* (2014.09); *A63F 13/816* (2014.09); *G09B 9/04* (2013.01); *G09B 9/066* (2013.01); *G09B 19/0038* (2013.01); *A61H 2201/165* (2013.01); *A63B 21/00061* (2013.01); *A63B 21/028* (2013.01); *A63B 69/0093* (2013.01); *A63B 2024/0096* (2013.01); *A63B 2220/24* (2013.01); *A63B 2220/40* (2013.01); *A63F 2300/1043* (2013.01); *A63F 2300/1062* (2013.01); *A63F 2300/8005* (2013.01)

(56) References Cited

U.S. PATENT DOCUMENTS

| | | | | |
|---|---|---|---|---|
| 1,565,484 A * | 12/1925 | McWhirter | A63B 22/18 | 482/146 |
| 1,585,748 A * | 5/1926 | Wendelken | A63B 21/16 | 472/14 |
| 1,911,572 A * | 5/1933 | Hulander | A63G 13/00 | 482/142 |
| 1,975,382 A * | 10/1934 | Wrobley | A61H 1/008 | 482/131 |
| 2,707,465 A * | 5/1955 | Steffen | A61H 1/0292 | 482/146 |
| 2,906,532 A * | 9/1959 | Echols | A61H 1/02 | 482/131 |
| 3,352,559 A * | 11/1967 | Larsen | A63B 69/3667 | 473/269 |
| 3,441,271 A * | 4/1969 | Palacios | A63B 22/14 | 472/14 |
| 3,702,188 A * | 11/1972 | Phillips | A63B 21/0083 | 482/113 |
| 3,713,653 A * | 1/1973 | Romans | A63B 22/18 | 482/146 |
| 4,121,488 A * | 10/1978 | Akiyama | G10H 1/32 | 200/86.5 |
| 4,488,017 A * | 12/1984 | Lee | G06F 3/0334 | 200/17 R |
| 4,660,828 A | 4/1987 | Weiss | | |
| 4,759,542 A * | 7/1988 | Hudec | A63B 22/16 | 482/146 |
| 4,817,950 A * | 4/1989 | Goo | A63B 69/0093 | 200/52 A |
| 4,850,588 A * | 7/1989 | Desjardins | A63B 26/003 | 482/146 |
| 4,905,994 A * | 3/1990 | Hartz | A63B 22/14 | 482/146 |
| 5,002,272 A * | 3/1991 | Hofmeister | A63B 21/028 | 482/127 |
| 5,049,079 A * | 9/1991 | Furtado | A63B 69/18 | 434/253 |
| 5,145,474 A * | 9/1992 | Moore | A63B 26/003 | 482/146 |
| 5,147,257 A * | 9/1992 | Loane | A63B 69/18 | 482/146 |
| 5,190,506 A * | 3/1993 | Zubik | A63B 22/16 | 482/146 |
| 5,256,127 A * | 10/1993 | Yeh | A63B 22/14 | 482/146 |
| 5,277,675 A | 1/1994 | Shifferaw | | |
| 5,283,555 A * | 2/1994 | Ward | G05G 9/047 | 345/156 |
| 5,320,593 A * | 6/1994 | Heatwole | A63B 26/003 | 482/146 |
| 5,399,140 A | 3/1995 | Klippel | | |
| 5,405,152 A * | 4/1995 | Katanics | A63F 13/06 | 273/148 B |
| 5,409,226 A * | 4/1995 | Mesko | A63F 13/08 | 273/148 B |
| 5,429,562 A * | 7/1995 | Milner | A63B 22/18 | 482/142 |
| 5,509,871 A * | 4/1996 | Giovanni | A63B 69/0093 | 482/30 |
| 5,582,567 A * | 12/1996 | Chang | A63B 22/16 | 482/132 |
| 5,613,690 A | 3/1997 | McShane et al. | | |
| 5,683,337 A * | 11/1997 | Zetocha | A63B 22/14 | 482/146 |
| 5,813,958 A * | 9/1998 | Tomita | A61H 1/0266 | 482/146 |
| 5,860,861 A | 1/1999 | Lipps et al. | | |
| 5,879,275 A * | 3/1999 | Aruin | A63B 22/14 | 482/146 |
| 5,925,000 A * | 7/1999 | Marciniak | A43B 7/24 | 482/8 |
| 5,941,807 A * | 8/1999 | Cassidy | A63B 22/14 | 482/130 |
| 6,019,712 A | 2/2000 | Duncan | | |
| 6,132,338 A | 10/2000 | Shiffera | | |
| 6,225,977 B1 * | 5/2001 | Li | G05G 1/52 | 345/156 |
| 6,428,451 B1 * | 8/2002 | Hall | A63B 22/18 | 482/146 |
| 6,543,769 B1 * | 4/2003 | Podoloff | A63B 21/0004 | 273/148 B |
| 6,624,802 B1 | 9/2003 | Klein et al. | | |
| 6,676,579 B1 * | 1/2004 | Lin | A63B 22/0012 | 482/146 |
| 6,695,755 B1 * | 2/2004 | Huang | A63B 22/18 | 482/146 |
| 6,942,487 B2 | 9/2005 | Corbalis | | |
| 6,945,920 B1 * | 9/2005 | Kemery | A63B 21/0004 | 482/146 |
| 7,008,359 B2 | 3/2006 | Fan et al. | | |
| 7,282,013 B2 * | 10/2007 | Ho | A63B 69/0093 | 463/36 |
| 7,300,392 B1 * | 11/2007 | Curran | A63B 21/0004 | 482/146 |
| 7,335,172 B2 * | 2/2008 | Laserow | A63B 21/0004 | 482/146 |
| 7,374,522 B2 * | 5/2008 | Arnold | A63B 21/005 | 482/146 |
| 7,645,221 B1 | 1/2010 | Curry | | |
| 2002/0177511 A1 * | 11/2002 | Jang | A61H 15/00 | 482/146 |
| 2003/0017922 A1 | 1/2003 | Sachs | | |
| 2003/0060338 A1 * | 3/2003 | Sayce | A63B 69/18 | 482/71 |
| 2003/0109365 A1 * | 6/2003 | Smith | A63B 23/00 | 482/146 |
| 2003/0199374 A1 * | 10/2003 | Perry | A61H 1/005 | 482/146 |
| 2004/0018924 A1 * | 1/2004 | Szydlowski | A63B 21/0004 | 482/146 |
| 2004/0023766 A1 * | 2/2004 | Slone | A63B 22/18 | 482/146 |
| 2004/0142802 A1 * | 7/2004 | Greenspan | A61H 1/0237 | 482/146 |
| 2005/0148450 A1 * | 7/2005 | Huang | A63B 22/14 | 482/147 |
| 2006/0079378 A1 * | 4/2006 | Ader | A63B 5/16 | 482/26 |
| 2006/0270536 A1 * | 11/2006 | Tukada | A63B 26/003 | 482/146 |
| 2007/0117697 A1 | 5/2007 | Genua | | |

(56) References Cited

U.S. PATENT DOCUMENTS

| | | | |
|---|---|---|---|
| 2007/0155495 A1* | 7/2007 | Goo | A63B 24/0003 463/36 |
| 2007/0184940 A1 | 8/2007 | Tomes | |
| 2007/0184953 A1 | 8/2007 | Luberski et al. | |
| 2007/0213187 A1* | 9/2007 | Morgan | A63B 22/0087 482/146 |
| 2007/0270296 A1* | 11/2007 | Caldicott | A63B 22/14 482/146 |
| 2008/0103034 A1* | 5/2008 | Mihara | A63B 22/16 482/146 |
| 2008/0153592 A1* | 6/2008 | James-Herbert | A63B 21/00 463/36 |
| 2008/0161175 A1* | 7/2008 | Ho | A63B 22/14 482/146 |
| 2008/0194392 A1 | 8/2008 | Langer et al. | |
| 2008/0228110 A1 | 9/2008 | Berme | |
| 2008/0261696 A1 | 10/2008 | Yamazaki et al. | |
| 2009/0215596 A1* | 8/2009 | Obermaier | A63B 5/08 482/142 |
| 2010/0093506 A1 | 4/2010 | Aigner | |

FOREIGN PATENT DOCUMENTS

| | | | | |
|---|---|---|---|---|
| DE | 19838801 A1 | * | 3/2000 | A63B 69/0093 |
| DE | 2007 048399 A1 | | 10/2007 | |
| EP | 0 966 724 B1 | | 11/2001 | |
| GB | 190124733 A | * | 0/1902 | |
| IT | EP 0761266 A2 | * | 3/1997 | A63F 13/08 |
| WO | WO 2008/043118 A1 | | 4/2008 | |

OTHER PUBLICATIONS

English Abstract for EP 0 966 724 B1.
English Abstract for WO 2008/043118 A1.
English Abstract for DE 2007 048399 A1.

* cited by examiner

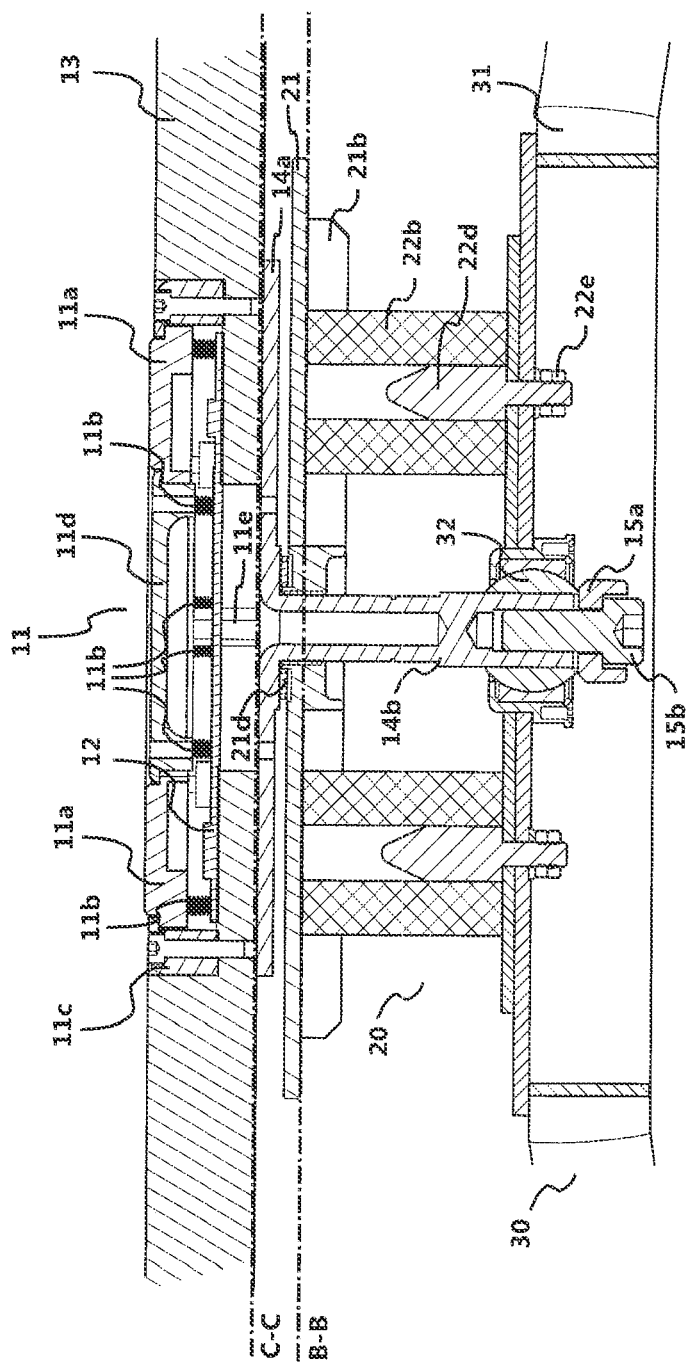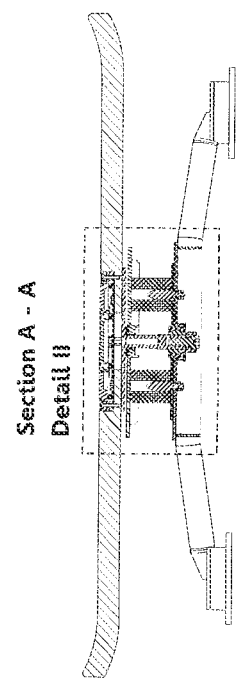
FIG. 4

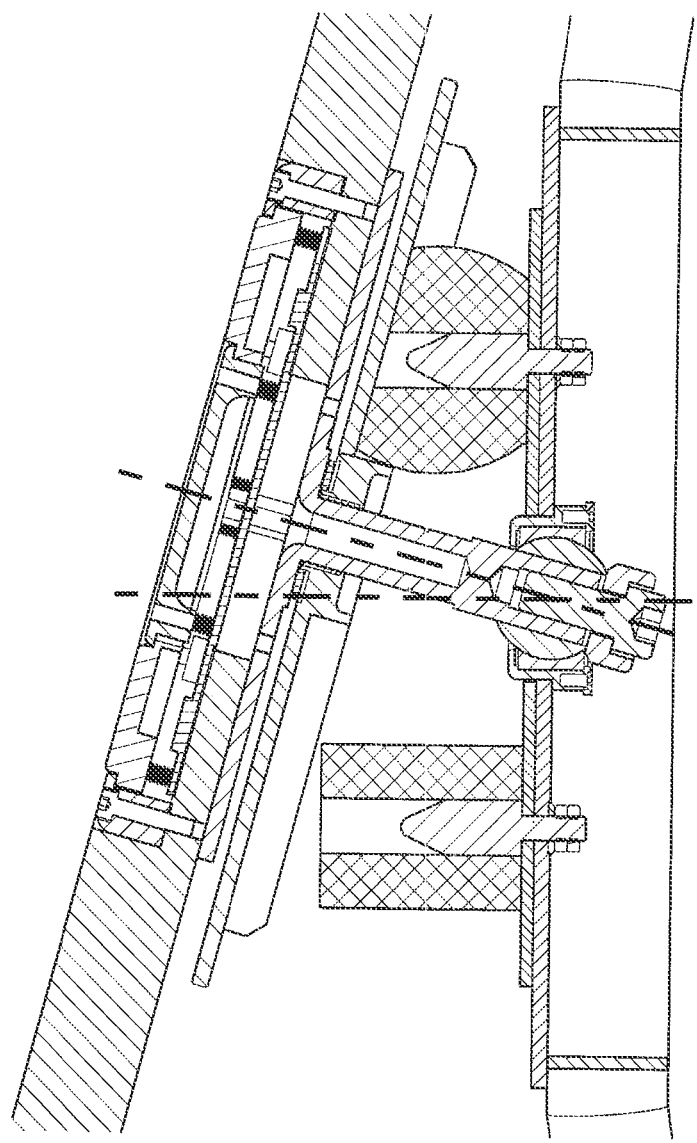
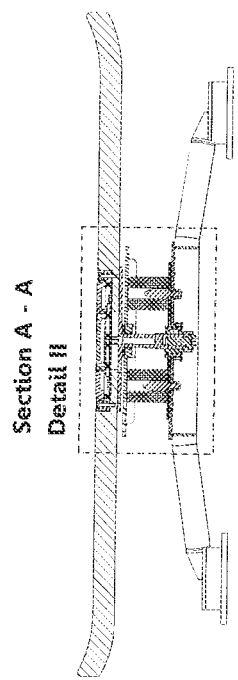
FIG. 5

DEVICE FOR BALANCE EXERCISES AND BALANCE GAMES USING VARIABLE RESTORING FORCES

CROSS-REFERENCE TO RELATED APPLICATION

This application is a continuation of U.S. patent application Ser. No. 13/382,923 filed on Mar. 16, 2012, which was filed under 35 U.S.C. §371 as a national stage application of International Application No. PCT/EP10/04279 filed Jul. 14, 2010, claiming priority from German Application No. 10 2009 033 440.8 filed Jul. 16, 2009, the disclosures thereof are incorporated by reference in their entireties.

FIELD OF THE INVENTION

The invention relates to an apparatus for balance exercises and balance games of a user, encompassing a base part, a support part for the user's body which is tiltable relative to the base part around a longitudinal axis X and a transverse axis Y, and a restoring apparatus for generating a restoring force that counteracts a tilt of the support part. An apparatus of this kind is also referred to as a "balance board."

BACKGROUND OF THE INVENTION

The balance boards known from the existing art serve, inter alia, as input devices for computer games. These balance boards are often used, for example, in computer games in which sports such as skateboarding, snowboarding, or surfing are simulated.

A further application sector of balance boards is utilization as a training or rehabilitation device with which users can practice balance and the coordination of certain motion sequences. These training or rehabilitation devices are usually not designed for use in conjunction with a computer, and therefore also do not possess sensor apparatuses for the generation of sensor signals that can be further processed by a computer.

Apparatuses for balance exercises and balance games (balance boards) are sufficiently known in the existing art. The following documents are closest to the invention presented here: US 2008/0261696 A1 discloses an apparatus for sensing weight displacements and jumping motions of a user. It encompasses a support surface that is mounted on four supporting feet. Beam-shaped spring elements are arranged respectively between the support surface and the four supporting feet. In the context of the greatly limited deformability of these spring elements, the support surface is tiltable relative to the supporting feet around two horizontal, mutually orthogonal spatial axes X and Y, and mounted movably along a vertical spatial axis Z orthogonal to the spatial axes X and Y. Attached onto each of the beam-shaped spring elements are strain gauges that sense the deformation of the spring elements. Weight displacements and jumping motions of the user are sensed indirectly via the deformation of the spring elements.

U.S. Pat. No. 7,008,359 B2 discloses an apparatus for balance exercises. It encompasses a base part, a support surface, and a central spring element that is arranged between the base part and support surface and is fixedly connected to each of them. The support surface can be tilted and rotated in relation to the base part, the spring element generating restoring forces that counteract those motions. The apparatus possesses an adjusting mechanism with which said restoring forces can be modified. The adjusting mechanism encompasses four wedge-like locking apparatuses that can simultaneously be shifted radially (relative to a central and vertical axis Z). When the locking apparatuses are shifted inward, the space for elastic deformation of the central spring element becomes smaller, bringing about an increase in the restoring force and at the same time a limitation of the maximum tilt angle.

EP 0 966 724 B1 discloses an apparatus for sensing weight displacements, rotational motions, and jumping motions of a user. A support surface is mounted on a base part, tiltably around two horizontal, mutually orthogonal spatial axes X and Y, as well as rotatably around a vertical spatial axis Z orthogonal to spatial axes X and Y and movably along said spatial axis Z. The restoring forces that counteract a tilt and a vertical motion of the support surface are generated by an air tube, and can be adjusted by modifying the inflation pressure in the air tube. The air tube is arranged between the base part and an intermediate part that is mounted nontiltably but rotatably relative to the support surface. A sensor apparatus senses the motions of the support surface and generates corresponding sensor signals.

All these balance boards have in common the fact that they comprise a support surface, tiltable on a base part, for the user's body, and a restoring apparatus for generating a restoring force counteracting the tilt. If the balance boards are designed to be used to control computer games, they furthermore possess a sensor apparatus that senses weight displacements on the support surface.

The disadvantage of the apparatus described in US 2008/0261696 A1 is that the tiltability of the support surface is so greatly limited that a tilt is barely perceptible by the user. This is disadvantageous because the user does not obtain direct feedback regarding the motions performed by him or her. Feedback instead occurs only indirectly via the respective computer program and the signal which is outputted again after processing the input signal. If, conversely, the support surface of the apparatus described in US 2008/0261696 A1 were to tilt perceptibly in the context of a weight displacement, the user would obtain direct physical feedback regarding the motions performed by him or her. The user would thereby be substantially better able to calibrate his or her weight displacements, which as a result would make a computer game easier to control.

A further disadvantage of the greatly limited tiltability of the support surface of the apparatus described in US 2008/0261696 A1 emerges when it is used to control computer games that simulate sports such as skateboarding, snowboarding, or surfing. In these sports, the corresponding items of sporting equipment (skateboards, snowboards, or surfboards) in reality execute pronounced motions, in which context the user obtains, by way of the change in the spatial position of the item, important feedback as to its interaction with the environment.

Because the support surface of the apparatus described in US 2008/0261696 A1 does not modify its spatial position in a manner similar to, for example, the item of sporting equipment that the apparatus represents in a computer game, the user does not obtain the impression that he or she is interacting, by way of the apparatus described in US 2008/0261696 A1, with the virtual environment of the computer game. This negatively affects the impression of a virtual reality, and disrupts the user's game experience.

A further disadvantage of the greatly limited tiltability of the support surface of the apparatus described in US 2008/0261696 A1 is lastly that this apparatus can be used to only a very limited extent as a training or rehabilitation device. The reason for this is that the strength and coordination of specific muscle groups such as, for example, the ankle musculature can be improved only when the user or patient is standing on a definitely tiltable support surface and must compensate for that tilt with his or her locomotor system.

A further disadvantage of the apparatus described in US 2008/0261696 A1 is that the restoring forces cannot be modified by the user. Given that the tiltability of the support surface of the apparatus described in US 2008/0261696 A1 is in any case very greatly limited, however, this disadvantage is acceptable, since the need for an adaptation of restoring forces increases only with an increasingly pronounced tiltability of the support surface. The reason is that as the tilting motions of the support surface become greater, it becomes that much more difficult for the user to maintain his or her balance when no restoring forces, or only small ones, are counteracting a tilt of the support surface.

The magnitude of the restoring forces experienced by a user as appropriate depends, however, not only on his or her skill and preferences, but also very substantially on his or her weight. In the context of a balance board conceived for the mass market, it would therefore be desirable if its restoring forces could be adapted both to the forces exerted on the balance board by a small child weighing 15 kg, and to the forces exerted on the balance board by a large adult weighing 150 kg.

The apparatus described in U.S. Pat. No. 7,008,359 B2 offers a definitely perceptible tiltability of the support surface, which is also absolutely necessary for the use, intended by the inventors, as a training and rehabilitation device. In the case of the apparatus described in U.S. Pat. No. 7,008,359 B2, the restoring forces can consequently be modified. The restoring forces are increased by the fact that the so-called locking mechanism decreases the space for an elastic deformation of the central rubber spring element, the result being to bring about a preload on the spring element.

A disadvantage of the apparatus described in U.S. Pat. No. 7,008,359 B2 is, however, that the increase in the restoring forces is accompanied by an increasing limitation of the tiltability of the support surface. It has already been mentioned, however, that certain training effects can be produced for the user only if he or she must compensate for pronounced tilting motions of a support surface. As a design constraint, therefore, not every user will be able to achieve the same training effect with this apparatus.

A further disadvantage of the apparatus described in U.S. Pat. No. 7,008,359 B2 is that the restoring forces cannot be modified independently of one another for different tilt directions. The central rubber spring element is indeed designed so that it generates smaller restoring forces in the context of a tilt around the longitudinal axis of the device than in the context of a tilt around the transverse axis. This takes into account the fact that the forces a user standing on the support surface is capable of exerting on the support surface by means of a weight displacement between his or her forefoot and heel are smaller than those produced by a weight displacement between his or her left and right foot, at least when the user is standing on the support surface with his or her feet comfortably at shoulder width.

But because the locking mechanism of the apparatus described in U.S. Pat. No. 7,008,359 B2 always engages simultaneously at four points on the central rubber spring element, and thus also simultaneously modifies the restoring forces in the context of a tilt around the longitudinal axis and a tilt around the transverse axis, the ratio of the restoring forces for the longitudinal and the transverse axis is defined as a result of the design and is not modifiable.

On the basis of experience, however, it is not the case that two users who prefer, for example, the same restoring forces in the context of a tilt around the transverse axis (i.e. in the context of a weight displacement between the left and right foot, and vice versa) will also always find the same restoring forces in the context of a tilt around the longitudinal axis (i.e. a weight displacement between the forefoot and heel) to be appropriate. This is especially not the case when these two users have feet of different sizes, since when the foot sizes are different, energy is introduced at different points, resulting in turn in non-identical lever ratios.

Optimally, however, it should be possible not only to modify the ratio between the restoring forces for the longitudinal axis and the transverse axis. For certain exercises, for example for rehabilitation in a context of unilateral injuries, it may be desirable for greater restoring forces to be generated with a displacement of weight onto the left foot than with a displacement of weight onto the right foot, and vice versa, or for greater restoring forces to be able to be generated with a displacement of weight onto the forefoot than with a displacement of weight onto the heel, and vice versa.

In the case of the apparatus described in EP 0 966 724 B1, the restoring forces can be modified with no limitation on the tiltability of the support surface, since here the increase in restoring force is achieved solely by way of an increase in the pressure in the air tube and not, as in the case of the apparatus described in U.S. Pat. No. 7,008,359 B2, by reducing the space for elastic deformation of the spring element.

The air cushioning technology of the apparatus described in EP 0 966 724 B1 also has disadvantages, however. In order for the air cushioning system not to have too highly progressive a spring characteristic, which would cause the cushioning to be perceived by the user as too hard, the air tube must have comparatively large dimensions. The components between which the air tube is arranged and against which it engages (which in EP 0 966 724 B1 are the base part and the intermediate part) must be designed to be similarly large. The result is large overall dimensions and heavy weight for the apparatus as a whole, making its handling in turn impractical. In addition, the comparatively high material usage has an unfavorable effect on manufacturing costs.

A further disadvantage is the fact that an accessory, for example an air pump with a pressure gauge, is needed in order to adapt the pressure in the air tube. This in turn increases the cost of the apparatus as a whole. In addition, a user may find that dealing with the accessory or filling the air tube is in itself inconvenient.

It is also the case that in the case of the apparatus described in EP 0 966 724 B1, the ratio of the restoring forces in the various tilt directions is defined in terms of physical design by the arrangement of the air tube, and is not modifiable. The disadvantages explained above with reference to U.S. Pat. No. 7,008,359 B2 are thus also relevant to EP 0 966 724 B1.

Yet another disadvantage arises when the apparatus described in EP 0 966 724 B1 is also used for computer simulation of certain sports such as snowboarding or surfing. Here a better impression of a virtual reality would be achievable if the return forces could, for example, be adjusted so that the support part is less easy to tilt forward than to tilt back, although this is also not possible with EP 0 966 724 B1.

SUMMARY OF THE INVENTION

It is consequently an object of the present invention, which the inventors call DYNAMIC BOARD, to make available a safe, compact, and economically manufacturable balance board having a restoring apparatus that enables maximally flexible and simple adaptation of the restoring forces to different users' needs without thereby limiting functionality, in particular the tiltability of the support surface.

According to a first aspect of the invention, this object is achieved in an apparatus of the species in that the restoring apparatus is designed to use replaceable spring elements having different dimensions or having a different spring force; that the restoring apparatus encompasses at least four individual spring elements; and that of the at least four spring elements, at least two are arranged parallel to the longitudinal axis X and at least two parallel to the transverse axis Y.

For purposes of the invention, a restoring apparatus is designed to use replaceable spring elements having different dimensions or having a different spring force if spring elements can be exchanged with no need for irreversible modifications to the apparatus as a whole. "No modification" in this context exists when, for example, the spring elements that are present are to be replaced with spring elements of smaller dimensions and, for example, a compensator piece must be used for that purpose. A restoring apparatus is therefore always designed to use replaceable spring elements having different dimensions or having a different spring force when the apparatus makes it possible to undo the exchange of one spring element for a different spring element having different dimensions or having a different spring force.

Designing the restoring apparatus so that replaceable spring elements having different dimensions or having a different spring force can be used offers substantial advantages as compared with certain restoring apparatuses known in the existing art that permit an adaptation of restoring forces to the differing needs of users.

One possibility, already mentioned above and known in the existing art, for increasing restoring forces involves putting the spring element under preload by means of an adjusting apparatus. The preloading of a spring element necessarily results, however, in a shortening of the spring travel that is still available for restoring a tilt. The consequence of this can be that heavier users, who prefer greater restoring forces, cannot achieve the tilt angles they actually desire, since the maximum spring compression has already been previously reached. An alternative would be to use a spring element whose spring travel is so long that even with a corresponding preload, sufficient spring travel is still available for achieving the desired tilt angle. This would, however, also increase the overall height of the apparatus. In addition, for users who need little or no preload, the support surface would then be mounted at a greater height above the floor than actually necessary, thereby increasing the danger of injury in the event of slippage off the support surface.

If provision is therefore made for adapting the return forces by way of an increase in preload, this always has a disadvantageous effect either on overall height or on the maximum tilt angle of the support surface. If, conversely, the restoring apparatus is designed to use replaceable spring elements having different dimensions or having a different spring force, then for each user there will be spring elements having the restoring force desired by him or her, which on the one hand have enough spring travel to achieve the desired tilt angles but on the other hand also do not have too long a spring travel that would result in an unnecessarily large overall height and also an increased risk of injury.

Another possibility, known in the existing art, for adapting the restoring forces that counteract a tilt of the support surface to the different needs of users is the use of spring elements whose spring force can be modified, e.g. an air cushioning system. As already set forth above, however, the use of an air cushioning system is complex in terms of design, and the components of an air cushioning system are comparatively expensive to manufacture. A restoring apparatus having replaceable spring elements is, conversely, substantially easier and more economical to manufacture.

The restoring apparatus of the apparatus according to the present invention furthermore encompasses not a one-piece spring element but instead at least four individual spring elements. This is advantageous in that the number of adaptation possibilities is also multiplied by the combination of multiple spring elements.

In contrast to the one-piece spring element, four individual spring elements also do not need to be arranged at the center of the apparatus (defined by the intersection of tilt axes X and Y). This proves to be favorable when the user is, as intended, standing on the support surface with his or her feet comfortably at shoulder width. In this case, in accordance with the lever principle, the shorter the spacing of the user's feet from the spring elements, the lower the force exerted by him or her on the spring elements. Because of the more favorable lever ratios, four spring elements that are arranged at a certain distance from the center of the apparatus thus need to generate, in total, lower restoring forces than one central spring element. This has the advantage that the spring elements can be of smaller dimensions, which in turn has a favorable effect on manufacturing costs.

A further advantage as compared with one central spring element is that the at least four individual, decentrally arranged spring elements do not additionally need to take on the function of fixedly connecting the support part and base part to one another. It is therefore possible to provide, at the center of the apparatus, a separate mount or connection between the support part and base part. There is thus no need in this case to create a fixed connection between the spring elements and the base part and between the spring elements and the support part (or a part connected nontiltably to the support part); this substantially simplifies replacement of the spring elements.

This is not to be understood to mean, however, that for purposes of the invention only those restoring apparatuses that possess a separate mount or connection between the support part and base part are designed to use replaceable spring elements having different dimensions or having a different spring force. It is also entirely possible to dispense with a separate mount and to connect the support part fixedly to the base part by way of the four spring elements. Even if the four spring elements were, for example, bolted to the support part and/or base part, this would nevertheless be an apparatus according to the present invention provided said spring elements can be exchanged for other spring elements having different dimensions or having a different spring force with no need to make irreversible modifications to the apparatus as a whole.

In addition, in the apparatus according to the present invention, of the at least four spring elements, at least two are arranged parallel to the longitudinal axis X and at least two parallel to the transverse axis Y. This is advantageous in particular because users who prefer, for example, the same restoring forces in the context of a weight displacement between the left and right foot (i.e. in the context of a tilt around the transverse axis Y) do not also always find the same restoring forces to be appropriate in the context of a weight displacement between the forefoot and heel (i.e. in the context of a tilt around the longitudinal axis X).

Specifically, if the spring elements are not aligned at the tilt axes X and Y, it is then thereby possible also to generate different restoring forces in the context of weight displacements between the left foot and right foot, and between the forefoot and heel. The ratio between the restoring forces upon a tilt around the longitudinal axis and the restoring forces upon a tilt around the transverse axis is then, however, defined by the physical design, specifically by the distances at which the spring elements are located respectively from tilt axes X and Y.

If, on the other hand, in a context of four spring elements, two are arranged parallel to the longitudinal axis X and two parallel to the transverse axis Y, this has the advantage that essentially only one spring element in each case counteracts the tilting of the support surface when the support surface is tilted exclusively around the longitudinal axis X or around the transverse axis Y. For example, if the support surface is tilted exclusively around the longitudinal axis X, essentially only one of the two spring elements that are arranged parallel to the transverse axis Y is counteracting the tilt of the support surface (leaving aside the comparatively small restoring forces that are simultaneously also generated by the two spring elements that are arranged parallel to the tilt axis X).

With this arrangement of the spring elements it is consequently possible not only to generate different restoring forces for weight displacements between the left foot and right foot, and between the forefoot and heel, but also to modify the ratio between the restoring forces in the context of a tilt around the longitudinal axis and the restoring forces in the context of a tilt around the transverse axis. This arrangement thus guarantees maximum flexibility in adapting the restoring forces to the various needs of users.

In a refinement of the apparatus according to the present invention, it is proposed that the spring elements be embodied as elastomer springs; this is to be understood as all spring elements whose elasticity is based very predominantly on the effect of entropy elasticity (in contrast to energy elasticity).

Elastomer springs are particularly well suited for use in an apparatus according to the present invention because, as compared e.g. to compression springs made of metal, they can establish relatively high spring forces over short spring travel lengths. This is, however the prerequisite for minimizing the overall height of the apparatus according to the present invention as a function of the predefined tilt angles. A minimized overall height is desirable in order to keep the risk of injury as low as possible, in the event of slippage off the support surface.

An optimal relationship between overall height and predefined tilt angles is achieved when the tilt of the support surface is limited not by the maximum spring compression of the spring elements, but instead because the support part comes to a stop against the floor or the base part. The reason is that in this case the maximum tilt angle of the support surface depends exclusively on the length of the support surface and the height at which it is mounted above the floor. In order for the tilt of the support surface no longer to be limited by the maximum spring compression of the spring elements, however, it is in turn necessary to arrange the spring elements relatively close to the center of the apparatus (defined by the intersection of the tilt axes).

An arrangement of the spring elements at only a short distance from the center of the apparatus places particular demands on the spring elements, however, for the following reasons: On the one hand, the spring travel that is available for establishing the desired restoring force becomes smaller, the closer to the center of the apparatus a spring element is arranged. On the other hand, however, the necessary restoring force also becomes larger, the closer to the center of the apparatus the spring element is arranged—at least when the user is, as intended, standing on the support surface with his or her feet comfortably at shoulder width. Specifically, in the context of a weight displacement, the farther away the user's foot (and therefore the force introduction point) is from the center of the apparatus, the greater (in accordance with the lever principle) the force the user is exerting on the spring element.

It is thus apparent that an apparatus optimized in terms of overall height requires that the spring elements that are used be able to establish relatively large spring forces with short spring travels. These requirements are met particularly well by elastomer springs.

In addition, however, elastomer springs are also particularly well suited for use in an apparatus according to the present invention because of their slightly progressive spring characteristic, since experience indicates that users perceive it as advantageous when the restoring force increases slightly with increasing tilt, since this makes it easier for users to maintain balance even at larger tilt angles.

It is further proposed that the elastomer springs be slipped onto holding apparatuses. This allows a user to exchange the elastomer springs conveniently and without tools if he or she wishes to adapt the restoring forces to a different user weight or if the elastomer springs need to be exchanged as a result of fatigue or settling.

It is furthermore advantageous to use elastomer springs produced from chloroprene rubber or polyurethane, which preferably are standardized in accordance with an industry standard, e.g. DIN 9835. This is advantageous because standardized elastomer springs made of chloroprene rubber or polyurethane are comparatively inexpensive to manufacture. These spring elements also can be exchanged economically if settling or fatigue of the spring elements should occur after extended use of the apparatus according to the present invention.

It is moreover proposed that the elastomer springs have a height of between 40 mm and 60 mm. The reason is that because elastomer springs of this height can on the one hand be arranged so that the support surface can achieve a tilt angle of approximately 15° that is desirable from the standpoint of sports medicine, and so that the tilt is limited not by the maximum spring compression of the elastomer springs but by contact between the platform and the floor. This is, however, as already explained, the prerequisite for an optimized overall height. Although the elastomer springs must, for this purpose, be arranged relatively close to the center of the apparatus, and (as also already explained) although rather unfavorable lever ratios result therefrom, elastomer springs of the proposed height on the other hand also generate sufficiently large restoring forces to adapt the apparatus to the needs of very heavy users. Elastomer springs of the proposed overall height therefore prove to be particularly advantageous for achieving the smallest possible overall height for the apparatus as a whole at tilt angles of up to approx. 15°, and thus minimizing the risk of injury to the user.

In a refinement of the apparatus according to the present invention, it is further proposed that the spring elements be capable of being offset parallel to the longitudinal axis X and/or parallel to the transverse axis Y, since in this manner the restoring forces can be adapted even more flexibly and accurately to users' needs.

When a spring element is offset outward from the center of the apparatus (said center being defined by the intersection of the tilt axes), the spring travel when the support surface tilts toward that spring element becomes longer; when the spring element is offset inward, the spring travel becomes shorter. The longer the spring travel, the greater the restoring force that is generated by the spring element and counteracts the tilt of the support surface, and vice versa.

Offsetting of the spring elements inward or outward has another effect as well, however, namely a change in lever ratios. The weight force exerted on the spring elements by a user standing on the support surface is greater, the farther inward the spring element is offset, and smaller, the farther outward it is offset.

For example, a heavy user who exerts large weight forces on the support surface can offset the spring elements outward, thereby at the same time achieving the result that on the one hand he or she exerts less of a weight force on the spring elements, and on the other hand the spring elements generate a greater restoring force.

The result of this dual effect, i.e. the shortening or lengthening of the spring travel in conjunction with the lengthening or shortening, respectively, of the lever, is that the spring elements need to be offset over only a relatively short distance in order to enable adaptation of the restoring forces over a wide spectrum.

If the restoring forces are adapted by offsetting the spring elements inward or outward, and not (as, for example, in the case of the apparatus described in U.S. Pat. No. 7,008,359 B2) by an increase or decrease, respectively, in the space for elastic deformation of the spring element, this also does not produce any disadvantageous restriction on tiltability, at least not when the spring elements are not offset so far outward that maximum spring compression is achieved as a result of the tilt.

If the apparatus according to the present invention is therefore designed not only to use replaceable spring elements having different dimensions or having a different spring force, but also to offset the spring elements parallel to the longitudinal axis X and/or parallel to the transverse axis Y, the result is that far fewer replaceable spring elements need to be available in order to permit adaptation of the restoring forces within a very wide spectrum.

If elastomer springs are used, for example, it is possible with elastomer springs having dimensions of 25×40 mm (parallel to transverse axis Y) and 32×50 mm (parallel to longitudinal axis X) to generate, by corresponding offsetting, restoring forces that are commensurate with a user weight in the range from approx. 15 kg to approx. 60 kg. With elastomer springs having dimensions of 32×50 mm (parallel to transverse axis Y) and 40×50 mm (parallel to longitudinal axis X), restoring forces that are appropriate for a user weight in the range from approx. 40 kg to approx. 150 kg are generated by corresponding offsetting. It is thus possible, by combining three pairs of standardized elastomer springs, to cover in simple and economical fashion a utilization range, in terms of user weight, from approx. 15 kg to approx. 150 kg, provided the elastomer springs can additionally be offset inward or outward.

Lastly, it is further advantageous if all four spring elements can be offset inward or outward independently of one another. That is because it is thereby possible to modify the ratio of the restoring forces in the various tilt directions not only by corresponding replacement of the spring elements, but also by a corresponding offset of the spring elements. Independent offsetting of the four spring elements thus on the one hand allows the restoring forces to be adjusted differently for weight displacements between the left foot and right foot, and between the forefoot and heel. On the other hand, the ratio between the restoring forces in the context of a tilt around the longitudinal axis and the restoring forces in the context of a tilt around the transverse axis can also be modified, which is advantageous in particular for users having the same weight but different foot sizes.

It is further proposed that the spring elements each be capable of being shifted in a guide groove in the base part. In this embodiment, the individual spring elements can be steplessly offset, the result being to allow very exact adaptation of the restoring forces to the individual requirements of the individual user.

According to a further aspect, the apparatus according to the present invention encompasses an adjusting apparatus with which all the spring elements can be offset simultaneously, the adjusting apparatus preferably being embodied as a rotatable adjusting disk having circular eccentric elongated holes.

An adjusting apparatus is advantageous when, for example, the apparatus is used on a frequently changing basis by various people who prefer different settings of the restoring apparatus. It is then possible, by means of an adjusting apparatus that simultaneously offsets all the spring elements, to perform an adaptation to user specifications easily and quickly. Use of an adjusting disk has, however, the disadvantage that the ratio between the restoring forces in the context of a tilt around the longitudinal axis and the restoring forces in the context of a tilt around the transverse axis is determined by the adjusting apparatus and is not modifiable.

If the adjusting apparatus is embodied as an adjusting disk having circular eccentric elongated holes, an exact adjustment of the restoring apparatus can be performed because of the reduction ratio with which a rotation of the adjusting disk effects an offset of the spring elements. Use of the adjusting disk is further advantageous because as a result of the self-locking of the adjusting disk, separate immobilization of the spring elements is no longer necessary.

The apparatus according to the present invention moreover preferably encompasses a sensor apparatus for sensing weight displacements of the user's body, so that the apparatus can be used not only as a training and rehabilitation device but also as an input device for a computer or a game console.

Displacements of the user's weight can be sensed in simple fashion if the sensor apparatus measures the tilt direction and tilt angle of the support surface, since the user can bring about a tilt of the support surface only via a weight displacement, provided the user is not holding onto anything (although that may be assumed when the apparatus is being used for balance exercises or balance games). It is understood that this sensing method relates only to a relative sensing of a user's weight displacements, since the tilt angle of the support surface depends not only on the force exerted on the support surface, but also on the restoring forces that have been set by the user by means of the restoring apparatus. Displacements of the user's weight can of course, however, be sensed not only via a measurement of the tilt angle of the support surface but also, for example, using force meters that are incorporated into the supporting feet of the apparatus according to the present invention.

In a refinement of the apparatus according to the present invention, it is further proposed that the support part be movable vertically along a vertical axis Z; that the apparatus according to the present invention encompass a restoring apparatus for generating a restoring force that counteracts a vertical motion of the support part; and that the apparatus according to the present invention encompass a sensor apparatus that senses vertical accelerations of the user's body.

If the apparatus according to the present invention encompasses a sensor apparatus with which not only weight displacements but also vertical accelerations of the user's body are sensed, this expands the potential applications of the apparatus according to the present invention as an input device for a computer or a game console. In the simulation of sports such as skateboarding, snowboarding, or surfing, for example, jumping motions in the virtual environment can be controlled by actual jumping motions of the user, making the simulation more realistic and intensifying the impression of a virtual reality.

Vertical accelerations of the user can be sensed in simple fashion if the support part is movable vertically along a vertical axis Z and if the apparatus according to the present invention encompasses a restoring apparatus for generating a restoring force that counteracts a vertical motion of the support part. In this case the sensor apparatus can measure the vertical motion of the support surface along the vertical axis Z and thereby indirectly sense vertical accelerations of the user's body. This is because the user can bring about a change in the vertical location of the support surface only by way of a vertical acceleration of his or her body's center of gravity, provided the user is not holding onto anything (although that may be assumed when the apparatus is being used for balance exercises or balance games). It is understood that this sensing method refers only to a relative sensing of a user's vertical accelerations, since the vertical motion of the support surface depends not only on the force exerted on the support surface, but also on the restoring forces that are generated by the restoring apparatus. Vertical accelerations of the user's body can of course, however, be sensed not only via a measurement of the vertical motion of the support surface but also, for example, using force meters that are incorporated into the supporting feet of the apparatus according to the present invention.

In a refinement of the apparatus according to the present invention, it is further proposed that the support part be rotatable around a vertical axis Z; that the apparatus according to the present invention encompass a rotational restoring apparatus for generating a restoring force that counteracts a rotation of the support part; and that the apparatus according to the present invention encompass a sensor apparatus that senses rotational motions of the user.

This embodiment firstly expands the potential applications of the apparatus as a training and rehabilitation device, since a rotation of the support surface, while overcoming a rotational restoring force counteracting the rotation, utilizes additional muscle groups of the user.

If the apparatus according to the present invention furthermore encompasses a sensor apparatus for sensing the rotational motions of the user, this also expands the potential applications of the apparatus according to the present invention as an input device for a computer or a game console. In the simulation of sports such as skateboarding, snowboarding, or surfing, for example, rotational motions in the virtual environment can be controlled by actual rotational motions of the user, making the simulation more realistic and intensifying the impression of a virtual reality.

It is further proposed that the support part be rotatable 360° clockwise and counter-clockwise as often as desired. This is in turn advantageous if the apparatus is used to simulate sports such as skateboarding, snowboarding, or surfing, since in these sports the respective items of sporting equipment can likewise be twisted 360° clockwise and counter-clockwise as often as desired. A platform that is freely rotatable in this fashion thus makes the simulation even more realistic, and further intensifies the impression of a virtual reality. Even when the apparatus is used as a training and rehabilitation device, however, a freely rotatable platform makes greater demands on the user and can be used in more versatile fashion than a platform that can be rotated only up to a certain angle.

It is further proposed that the rotational restoring apparatus generate a restoring force that returns the support part, when twisted, to an initial position; and that the restoring force reach its maximum when the support part is twisted half a revolution clockwise or counter-clockwise out of that initial position. This is particularly advantageous in turn if the apparatus according to the present invention serves as an input device for computer simulation of sports such as skateboarding or snowboarding. In this case the user will set up the apparatus as a whole in such a way that its longitudinal axis X is oriented perpendicular to the plane of the screen of the computer or the game console, since this orientation corresponds to the orientation of the simulated item of sporting equipment when traveling straight ahead.

If the user exerts on the platform a torque that does not exceed the maximum restoring force that is established in the context of a 180-degree twist, the platform is returned to the initial position by the restoring force, oppositely to the rotation direction initiated by the user. If, on the other hand, the user exerts on the platform a torque that exceeds the maximum restoring force at 180°, the restoring force that is established (and any excess torque of the user) will return the platform to the initial position in the rotation direction initiated by the user, with the result that the user has then completed one 360-degree revolution. The user will therefore, after execution of a rotational motion and once restoring is complete, always find him- or herself in the same position with respect to the screen as before execution of the rotational motion, the result being that control of the computer simulation is made easier. In addition, this embodiment of the rotational restoring apparatus contributes to the impression of a realistic simulation, since in reality skateboards or snowboards likewise exhibit a tendency to align themselves along the direction of travel.

Alternatively, it is proposed that the rotational restoring apparatus generate a restoring force that returns the support part, when twisted, to one of two initial positions that are located 180° opposite to one another; and that the restoring force reach its maximum when the support part is rotated one-quarter revolution clockwise or counter-clockwise out of those two initial positions.

With this embodiment, if the user exerts on the platform a torque that does not exceed the maximum restoring force that is established in the context of a 90-degree twist, the platform is returned to the first initial position by the restoring force oppositely to the rotation direction initiated by the user. If, on the other hand, the user exerts on the platform a torque that exceeds the maximum restoring force at 90°, the restoring force that is established (and any excess torque of the user) will direct the platform to the second initial position, which is located 180° opposite to the first initial position, in the rotation direction initiated by the user. The user will therefore, after execution of a rotational motion and once restoring is complete, always find him- or herself in the same position with respect to the screen as before execution of the rotational motion, or in a position that is mirror-reversed with respect thereto.

As compared with the approach described previously, with only one initial position, this is advantageous in that for many users it might be too difficult to maintain balance in the context of 360-degree revolutions. The impression of a realistic simulation would furthermore also be supported by this embodiment with two initial positions, since in reality skateboards or snowboards can, for example, likewise be used in two different positions (these positions being referred to as "regular" or "goofy" depending on which foot is toward the front in the direction of travel).

A rotational restoring apparatus having the aforementioned properties can be manufactured economically and at the same time compactly, since it encompasses a counterelement that takes the form of a straight cylinder and is connected nonrotatably to the platform, as well as at least one spring element that engages against the enveloping surface of said cylindrical counterelement.

If the bottom surface of the cylindrical counterelement has a symmetrical oval shape, this implements in simple fashion a rotational restoring apparatus which returns the support part, when twisted, to an initial position, and the restoring force of which reaches its maximum when the support part is twisted half a revolution clockwise or counter-clockwise out of that initial position.

If the symmetrical oval basic shape of the cylindrical counterelement is moreover modified in such a way that an indentation is provided at at least one vertex of the oval basic shape, the spring element that engages against the enveloping surface of said cylindrical counterelement can latch into said indentation. This latching prevents the support part from moving out of the initial position when the user, while tilting the standing surface by means of weight displacements on the standing surface, also inadvertently executes smaller rotational motions, as may occur, for example, when a user moves his or her arms in order to regain his or her balance. If a rotation of the standing surface were also initiated in this case, this could cause the user to lose his or her balance entirely and no longer be able to remain on the standing surface. The latching in the initial position according to the present invention thus serves for user safety.

If, on the other hand, the bottom surface of the cylindrical counterelement has an elliptical shape, this implements in simple fashion a rotational restoring apparatus which returns the support part, when twisted, into one of two initial positions that are located 180° opposite to one another and whose restoring force reaches its maximum when the support part is rotated clockwise or counter-clockwise one-quarter revolution out of said two initial positions.

The elliptical basic shape of the cylindrical counterelement is preferably modified in such a way that an indentation is provided at two vertices of the elliptical basic shape, preferably at the two secondary vertices, i.e. at the two points closest to the center of the ellipse. It is thereby possible to achieve a latching of the support part in two initial positions located 180 degrees opposite to one another. This has, for the safety of the user, the same advantages that have already been explained previously in the context of the apparatus according to the present invention with latching in only one initial position.

It is further proposed that the spring element encompass a contact element whose contact surface is in rolling contact against the enveloping surface of the cylindrical counterelement. This rolling contact minimizes friction between the spring element and the counterelement, thereby ensuring that even in angular positions with unfavorable lever ratios, the support part is reliably directed back into its initial position. This is advantageous because it makes handling of the apparatus according to the present invention easier and safer if the user, after executing a rotational motion, always finds him- or herself back in the same orientation with respect to his or her environment.

It is furthermore advantageous if, when the support part is in the initial position, said contact element rests in partially positive fashion in the indentation of the cylindrical counterelement, since in this manner comparatively little noise occurs when the support part latches in the initial position.

According to a further aspect of the invention, the restoring force that counteracts a twist of the support surface is adjustable. This is advantageous because, for example, a child can exert a very much smaller torque on the platform with his or her rotational motion than can an adult. If the rotational restoring force were not adjustable, the rotational restoring force would thus need to be designed to be very low so that children would also be capable of initiating a complete twist of the support part. This would, however, have critical disadvantages for adult users. As already explained, smaller torques are often inadvertently exerted on the platform, especially due to motion of the arms. If the rotational restoring force is very low, then especially adults with a large body mass would often trigger rotational motions of the support part even though they had intended only to tilt the platform by way of a weight displacement. This would make handling of the apparatus according to the present invention much more difficult especially for heavier adults, and in the worst case might result in falls and injuries if a user can no longer control an inadvertently initiated rotational motion. In a safe balance board that is as easy as possible to handle, the rotational restoring forces should therefore also be adjustable.

In a refinement of the apparatus according to the present invention, it is further proposed that a button area having at least two buttons be provided on the platform of the support part. This is advantageous in that a user, when utilizing the apparatus according to the present invention as an input device for a computer game, requires no further input devices in order, for example, to navigate in the computer game's menu.

It is further proposed that upon actuation of the buttons, a signal is triggered only when the surface of the buttons is located below the surface of the platform. This embodiment ensures that the buttons are actuated only deliberately with the toe area, and not inadvertently with the sole of the foot during a balance exercise or a balance game.

According to a further aspect, the apparatus according to the present invention lastly encompasses a vibration apparatus that transfers vibrations to the support part and is controlled by signals of a computer program. The apparatus can in this fashion convey to the user, by way of the vibrations, a haptic feedback regarding specific events occurring in a computer game. In the training sector, warnings can also thereby be conveyed to the user, for example when a specific tilt angle that should not be exceeded from a therapeutic standpoint, or because of a risk of injury, is exceeded.

BRIEF DESCRIPTION OF THE DRAWINGS

The apparatus according to the present invention for balance exercises and balance games having modifiable restoring forces, hereinafter also referred to as a DYNAMIC BOARD, will be explained in more detail below with reference to the appended drawings, in which

FIG. 4 is an enlarged sectional view of detail II;

FIG. 5 is an enlarged sectional view of detail II in a tilted position;

DETAILED DESCRIPTION OF THE PREFERRED EMBODIMENTS

Figure 1:
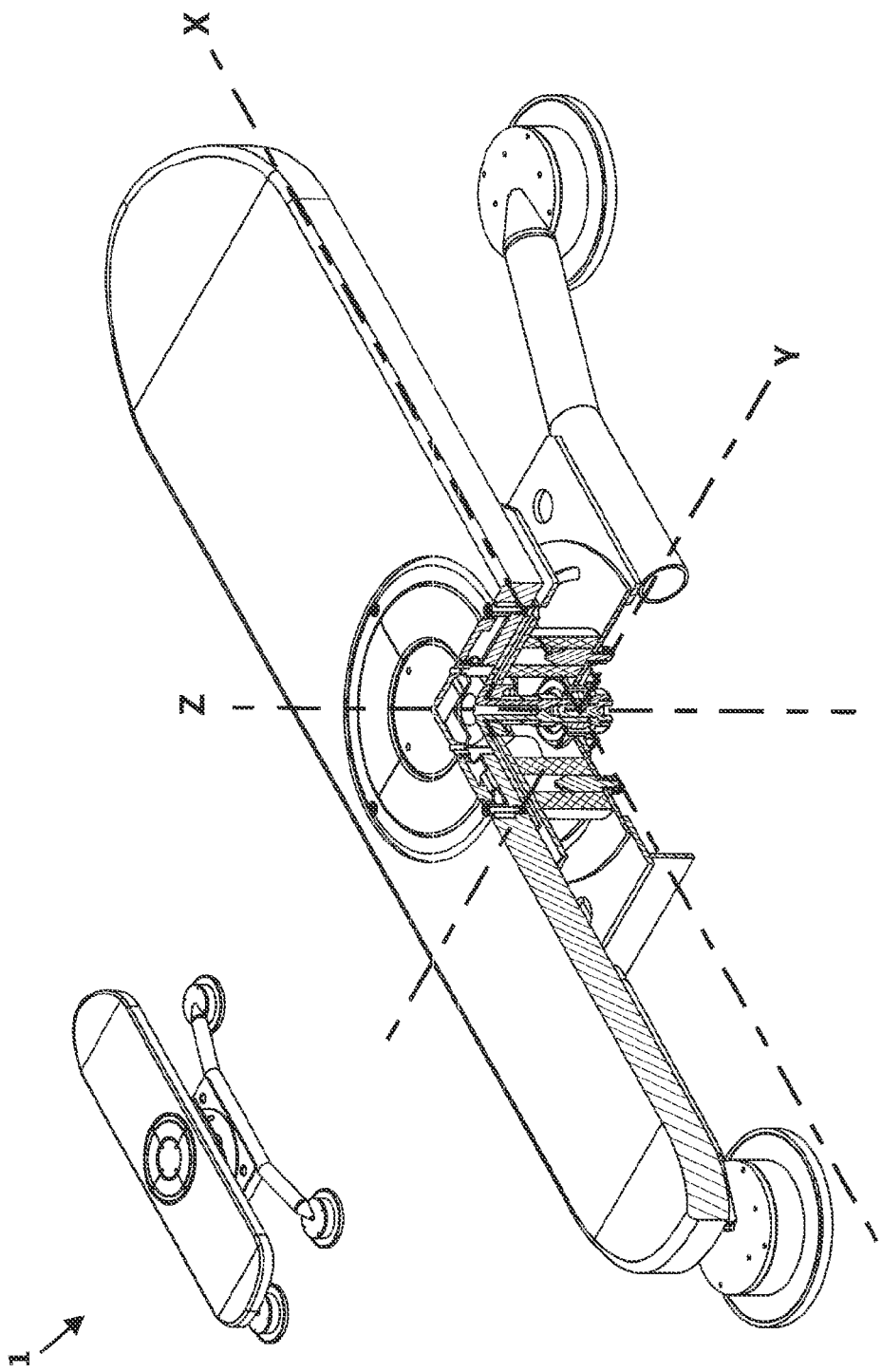
FIG. 1 is a perspective overall view of the DYNAMIC BOARD according to the present invention.
Figure 2:
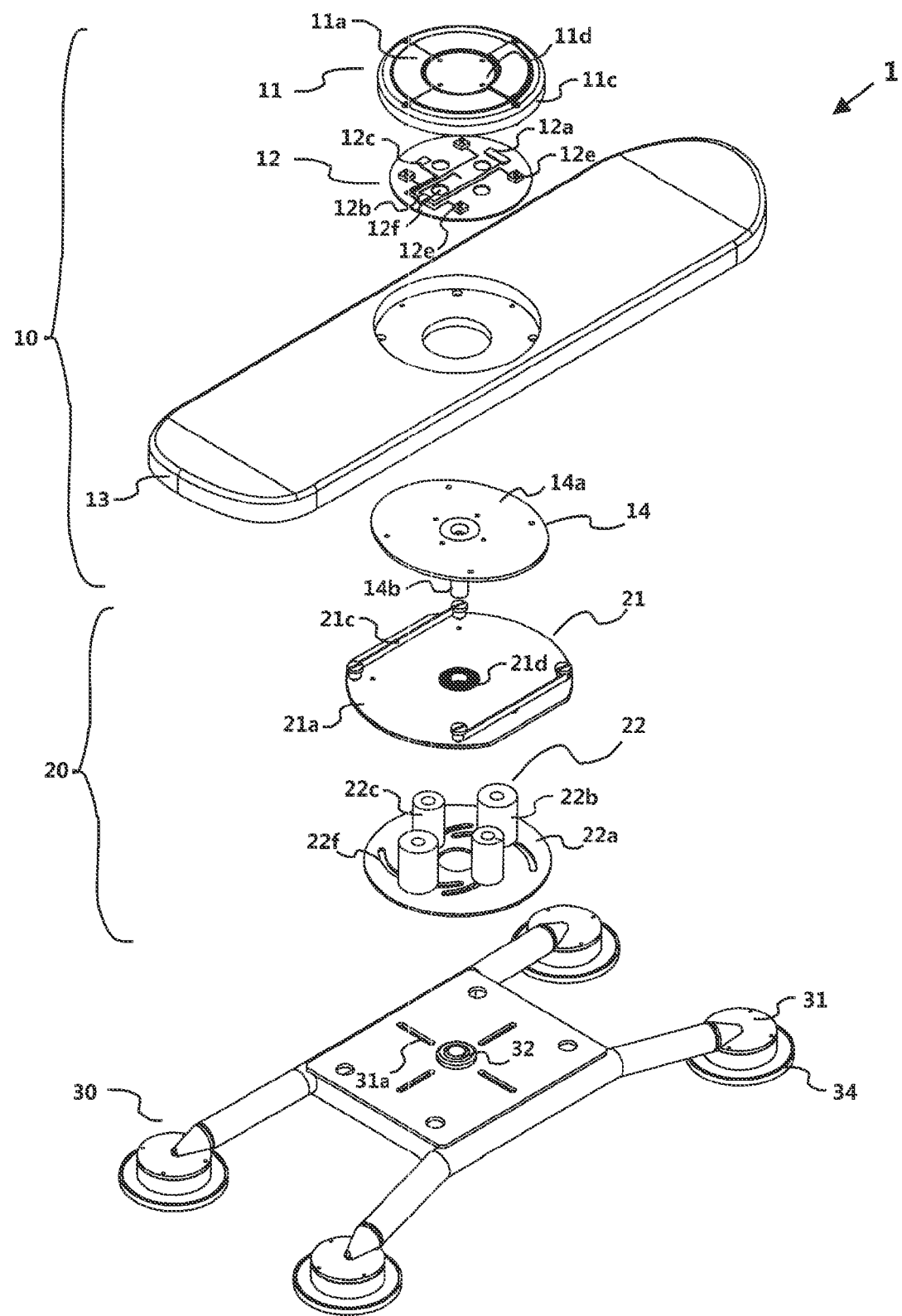
FIG. 2 is an exploded perspective view of the apparatus.

The DYNAMIC BOARD is labeled very generally with the number 1 in FIG. 1 and FIG. 2. It is made up of three main assemblies, namely support part 10, restoring apparatus 20, and base part 30 (see FIG. 2).

Support part 10 encompasses platform 13, button unit 11, electronics unit 12, and carrier plate 14 with bearing pin 14b. Carrier plate 14 with bearing pin 14b is made up of an elliptically shaped carrier plate 14a and the bearing pin 14b fixedly connected thereto, bearing pin 14b being aligned at the center point of the elliptical carrier plate 14a. The center point of the elliptical carrier plate 14a is defined by the intersection of the two axes of symmetry of the ellipse. Platform 13 is bolted to carrier plate 14a.

Electronics unit 12 is made up of motion sensor unit 12a, processor unit 12b, interface unit 12c for wireless data exchange, and the battery (not depicted). Motion sensor unit 12a involves commercially usual electronic measurement systems, preferably microelectromechanical (MEM) gyroscopes and accelerometers. Electronics unit 12 is located in a central depression in platform 13, and is bolted to platform 13.

Button unit 11 (see also FIG. 4) is likewise fitted into the central depression in platform 13, above electronics unit 12. The four movable buttons 11a of button unit 11 each have associated with them a switch element 12e, located therebelow, on electronics unit 12. Buttons 11a are held under compression by eight compression springs 11b, as seen in FIG. 4, inside retaining ring 11c and retaining plate 11d. Retaining ring 11c is bolted to platform 13. The bolts for securing retaining plate 11d are bolted to carrier plate 14a through four spacer sleeves 11e, as seen in FIG. 4. Spacer sleeves 11e pass through four cutouts 12f in electronics unit 12. The surface of the four buttons 11a is largely flush with the top surface of platform 13. Contact between the movable buttons 11a and switch elements 12e located respectively therebeneath occurs only when the buttons 11a have been pushed downward sufficiently far that the top surface of buttons 11a is located below the top surface of platform 13.

Support part 10 and base part 30 are connected via carrier plate 14 with bearing pin 14b, by the fact that bearing pin 14b is guided through pivot bearing 32 fastened in basic frame 31 and secured by means of screw 15b (see FIG. 4). Spacer sleeve 15a is inserted between the head of the screw 15b and the movable part of pivot bearing 32 so that the movability of pivot bearing 32 is not limited. Pivot bearing 32 is preferably embodied in accordance with DIN 648, and with a permissible tilt angle of at least 15°. As a result of this arrangement, support part 10 can be tilted around two horizontal and mutually orthogonal axes X and Y, and rotated around a vertical axis Z, relative to base part 30. In addition, support part 10 can be moved in translation in the direction of vertical axis Z.

The movements of support part 10 that are recited above are sensed by way of motion sensor unit 12a of electronics unit 12 that is connected fixedly to the support part 10 (see FIG. 2). Specific motions of the user that he or she executes on platform 13, for example weight displacements, rotational motions, and jumping motions, can be indirectly sensed by way of the motions of support part 10.

Restoring part 20 (see FIG. 2) encompasses a rotational restoring unit 21 and tilt restoring unit 22 as subassemblies. Rotational restoring unit 21 is made up of intermediate carrier 21a, axial bearing 21d, and two leaf spring units 21c. Intermediate carrier 21a rests in planar fashion on spring elements 22b and 22c of tilt restoring unit 22. The underside of intermediate carrier 21a is stiffened by means of cross members 21b (see FIG. 4) connected fixedly thereto. Cross members 21b extend in parallel fashion over almost the entire length of the underside of intermediate carrier 21a, the spacing between them being selected so that the two longitudinal spring elements 22b fit in the center between the cross members 21b. This prevents intermediate carrier 21a from twisting with reference to tilt restoring unit 22 and base part 30. The two leaf spring units 21c are fastened on the upper side of intermediate carrier 21a.

Carrier plate 14 with bearing pin 14b is mounted, via bearing pin 14b, rotatably relative to intermediate carrier 21a. Axial bearing 21d is located between carrier plate 14 with bearing pin 14b and intermediate carrier 21a. To minimize overall height, axial bearing 21d is preferably embodied as an axial bearing in accordance with DIN 711 or DIN 722. Support part 10 can thus be rotated as desired, with little friction, with respect to restoring part 20. Upon a rotation of support part 10 of up to 90° in each case, the two leaf spring units 21c are preloaded by the engagement of the elliptically shaped carrier plate 14a, and thereby bring about a restoration to the original position. Upon a rotation of support part 10 of more than 90°, the above-described arrangement brings about a rotation of support part 10 to a new initial position located 180° opposite to the original position.

Figure 6:
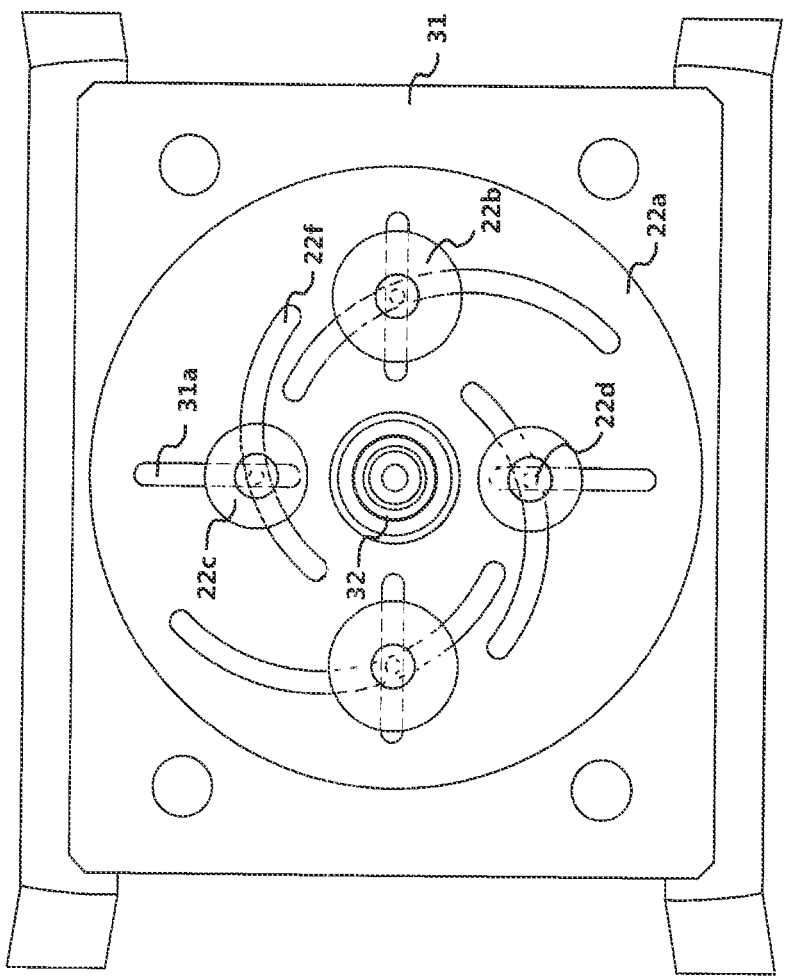
FIG. 6 is an enlarged depiction of sectional view B-B.

Tilt restoring unit 22 encompasses two longitudinal spring elements 22b, two transverse spring elements 22c, and four spring element holders 22d (see FIG. 4 and FIG. 6). The two longitudinal spring elements 22b and the two transverse spring elements 22c are each slipped from above onto the four spring element holders 22d. The four spring element holders 22d are each inserted into an elongated hole 31a in basic frame 31, and secured below basic frame 31 each with two flat nuts 22e. Of the four elongated holes 31a in the basic frame, two extend parallel to longitudinal axis X, and two parallel to transverse axis Y (see FIG. 1 and FIG. 6). By means of spring element holders 22d guided in elongated holes 31a, all the spring elements 22b and 22c are thus shiftable individually and steplessly on base part 30, the shift occurring parallel to longitudinal axis X and to transverse axis Y, respectively.

A tightening of screw 15b reduces the spacing between support part 10 and base part 30, and thus also the spacing of the components against which spring elements 22b and 22c engage (see FIG. 4). Spring elements 22b and 22c can thus be pre-tensioned by tightening screw 15b. It is also possible in this fashion to compensate for an aging-related settling (shrinkage) of spring elements 22b and 22c. A loosening of screw 15b, conversely, allows any pre-tensioning of spring elements 22b and 22c to be released, in order to facilitate shifting of spring element holders 22d on the base part 30.

Tilt restoring unit 22 can selectably be used in combination with adjusting disk 22a (see FIG. 6). This makes it possible, by rotating the adjusting disk 22a, to shift all spring elements 22b and 22c simultaneously and at a specific ratio. In this context, spring element holders 22d simultaneously project through the circular elongated holes 22f, arranged eccentrically with respect to vertical axis Z, of adjusting disk 22a, and elongated holes 31a in basic frame 31. The shifting of spring elements 22b and 22c occurs, steplessly and with little energy expenditure, by way of the gated guide thereby realized.

Figure 3:
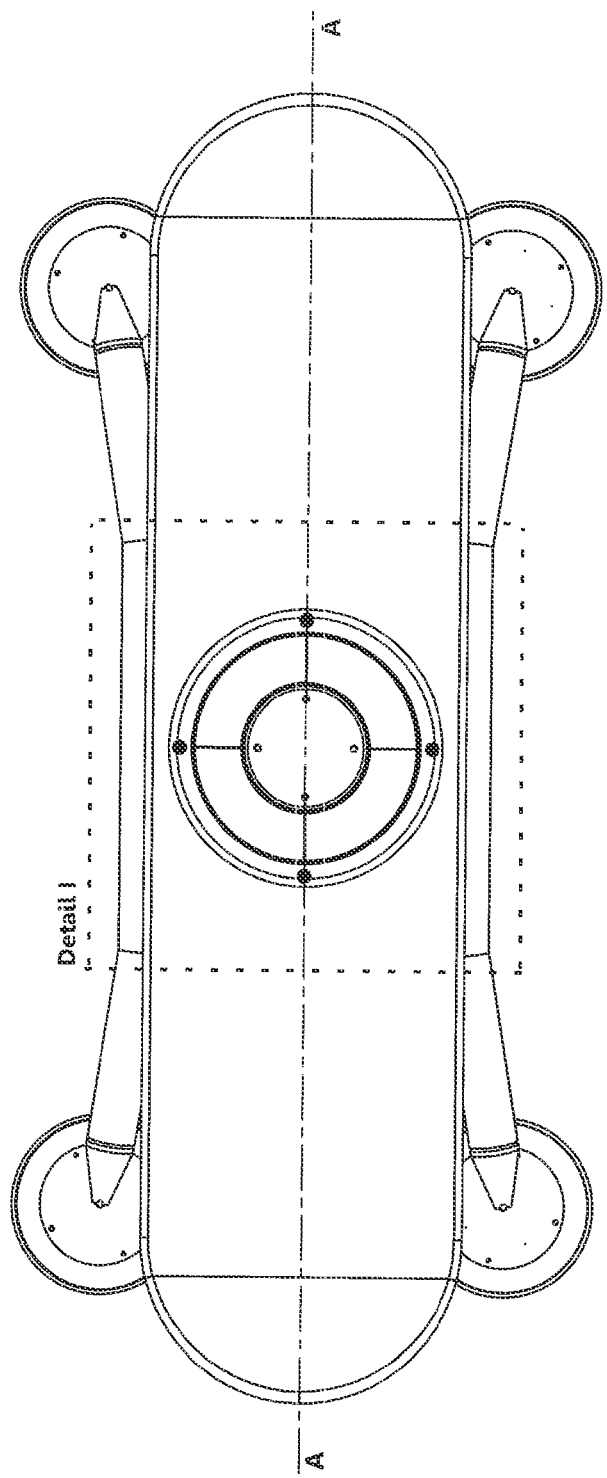
FIG. 3 is a plan view of the platform with section A-A labeled.

Base part 30 encompasses basic frame 31, pivot bearing 32, and four rubber plates 34. Basic frame 31 comprises four supporting feet, arranged symmetrically with respect to section axis A-A of FIG. 3, on which rubber plates 34 are respectively attached. The position of the four supporting feet on basic frame 31 is selected so that secure stability of the DYNAMIC BOARD is guaranteed in the context of any displacement of the center of gravity of a user's body on platform 13.

A vibration apparatus (not shown), which is activated by electronics unit 12, is optionally incorporated into platform 13. The vibration apparatus is a commercially available signal transducer that generates vibrations using asymmetrical weight driven by electric motors and that is known, for example, from manual control devices for video game consoles (called "game pads").

Figure 7:
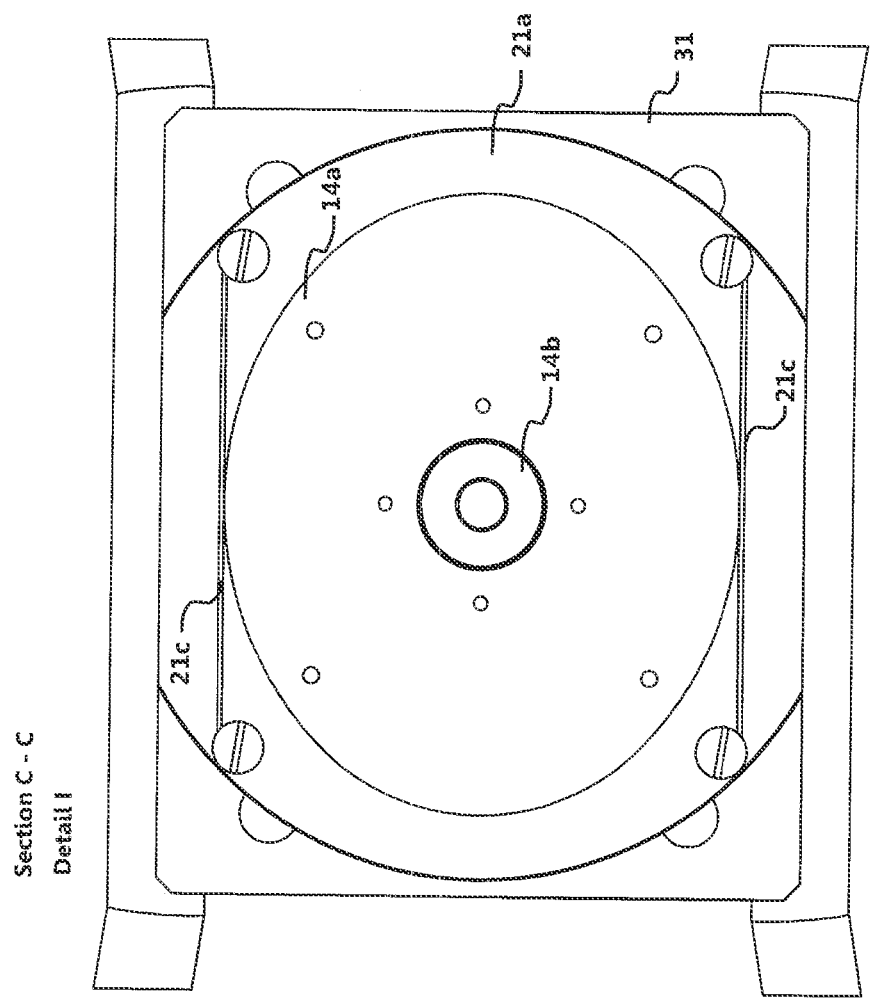
FIG. 7 is an enlarged depiction of sectional view C-C.
Figure 8:
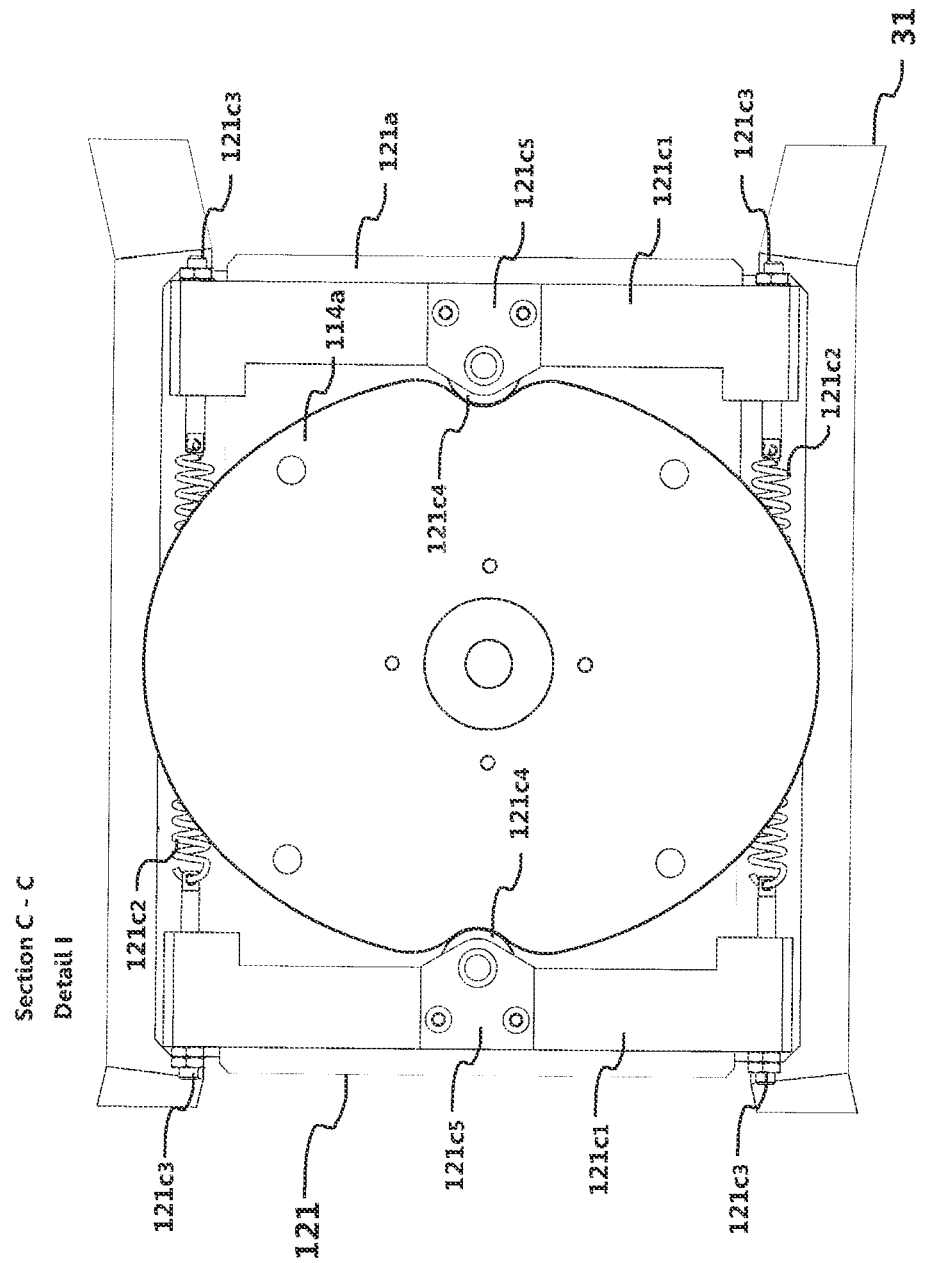
FIG. 8 is an enlarged depiction of sectional view C-C for an alternative embodiment.

FIG. 8 shows the rotational restoring apparatus of an alternative embodiment of the DYNAMIC BOARD, in a depiction analogous to FIG. 7. The rotational restoring apparatus corresponds in substantial portions to the embodiment according to FIG. 7, for which reason analogous parts are labeled in FIG. 8 with the same reference characters but incremented by 100. In addition, the alternative embodiment in accordance with FIG. 8 is described below only insofar as it differs from the one in accordance with FIG. 7.

In the embodiment in accordance with FIG. 8, rotational restoring unit 121 encompasses intermediate carrier 121a having fixed cross members 121b (not depicted) and a tension spring unit as a sub-group. The tension spring unit sub-group encompasses two carriages 121c1 made of polyacetal or polyformaldehyde, two tension springs 121c2, four threaded rods 121c3, two deep groove ball bearings 121c4 per DIN 625, and two holding plates with bearing shaft.

Intermediate carrier 121a is embodied as a rectangular plate. As is also the case in the embodiment in accordance with FIG. 7, the underside of intermediate carrier 121a rests in planar fashion on spring elements 22b and 22c of tilt restoring unit 22, and is stiffened by two respective cross members 21b connected fixedly thereto. Exactly as in the case of the original embodiment, this prevents intermediate carrier 121a from becoming twisted with reference to tilt restoring unit 22 and base part 30 (see FIG. 4).

The two carriages 121c1 are mounted on intermediate carrier 121a by means of a linear slide guide. For this purpose, intermediate carrier 121a is machined flat on both sides. The two carriages 121c1 are connected at both ends via the tension spring 121c2 in each case. The preload of the two tension springs 121c2 can be steplessly adjusted by way of threaded rods 121c3 at each end of said tension springs 121c2. The respectively deep groove ball bearing 121c4 is rotatably mounted and centered on the inner side of the carriages 121c1. Deep groove ball bearings 121c4 are retained by the holding plate 121c5 with the bearing shaft that is bolted to the carriage 121c1.

Carrier plate 114a has an elliptical basic shape that is interrupted by two indentations. The indentations are recessed into the elliptical basic shape at the location of the two secondary vertices of that ellipse, i.e. the two points closest to the center point of the ellipse. The radius of the indentations corresponds to the radius of the two deep groove ball bearings 121c4. Carrier plate 114a is arranged with a 90° twist as compared with the variant embodiment according to FIG. 7. Linear sliding guidance of the two carriages 121c1 occurs along the longitudinal axis of the apparatus as a whole.

As a result of the preload of tension springs 121c2 and the positive seating of deep groove ball bearings 121c4 in the indentations of carrier plate 114a, support part 10 is retained, in two initial positions, to prevent twisting relative to intermediate carrier 121a and base part 30. In these two initial positions, located 180° opposite to one another, platform 13 is oriented lengthwise with respect to base part 30. The retention can be released by the user by introducing a torque via platform 13 into carrier plate 114a fixedly connected thereto.

The excursion of the two carriages 121c1, and thus also the force exerted by tension springs 121c2 via the two deep groove ball bearings 121c4 on carrier plate 114a, changes depending on the degree of twisting of platform 13 and thus of carrier plate 114a. When twisting occurs, the two deep groove ball bearings 121c4 make rolling contact against the lateral surface of carrier plate 114a. This rolling contact minimizes the friction between carriages 121c1 and the carrier plate, thereby ensuring that even in angular positions with unfavorable lever ratios, support part 10 is reliably directed back into one of the two initial positions.

In the context of a 90° twist, deep groove ball bearings 121c4 abut against the two principal vertices of the elliptical carrier plate 114a, i.e. against the points farthest away from the rotation point of carrier plate 114a. In this position carriages 121c1 have the greatest possible excursion, and tension springs 121c2 the greatest possible tension, with the result that the restoring force reaches its maximum. If the user exerts on platform 13 a torque that does not overcome this maximum restoring force at 90°, support part 10 is returned by the restoring force, opposite to the rotation direction initiated by the user, to the first initial position and is latched therein. If, on the other hand, the user exerts on platform 13 a torque that exceeds the maximum restoring force at 90°, the restoring force that is established (and any excess torque of the user) will direct support part 10, in the rotation direction initiated by the user, to the second initial position that is located 180° opposite to the first initial position, and latch it therein.

Figure 9:
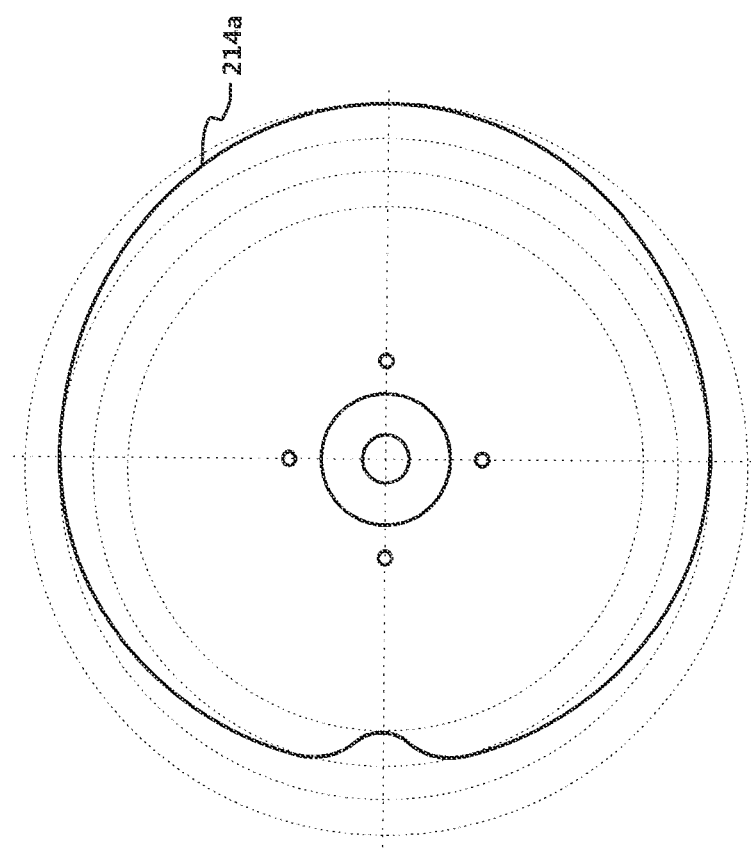
FIG. 9 depicts a carrier plate for an alternative embodiment.

In FIG. 9 an alternative embodiment of carrier plate 14a/114a of the DYNAMIC BOARD is depicted and is labeled 214a. When this carrier plate 214a is used, the rotational restoring apparatus in accordance with FIG. 8 must be modified in such a way that the tension spring unit encompasses only one carriage 121c1 having a deep groove ball bearing 121c4, and that the two tension springs 121c2 at the other end are connected not to a second carriage 121c1 but instead fixedly to intermediate carrier 121a.

Carrier plate 214a has a symmetrical oval basic shape. The rotation point of carrier plate 214a is arranged so that it is at identical distances from two oppositely located vertex points of the oval basic shape, and at non-identical distances from the other two oppositely located vertex points. The oval basic shape of carrier plate 214a is interrupted by an indentation. The indentation is recessed into the oval basic shape at the point at which the vertex point is closest to the rotation point.

In the context of a 180° twist, the one deep groove ball bearing 121c4 rests against that point on the oval carrier plate 114a that is farthest from its rotation point. In this position carriage 121c1 then has the greatest possible excursion, and tension springs 121c2 have the greatest possible tension, with the result that the restoring force reaches its maximum. If the user exerts on platform 13 a torque that does not overcome this maximum restoring force at 180°, support part 10 is returned by the restoring force, oppositely to the rotation direction initiated by the user, to the first initial position, and is latched therein. If, on the other hand, the user exerts on platform 13 a torque that exceeds the maximum restoring force at 180°, the restoring force that is established (and any excess torque of the user) will return support part 10, in the rotation direction initiated by the user, to the initial position and latch it therein.

The invention claimed is:

1. A board apparatus for balance exercises and balance games of a user, comprising:
    a base part,
    a support part for the user's body, said support part including a platform which is tiltable relative to the base part, and
    a restoring part configured to generate a restoring force that counteracts a tilt of the support part,
    wherein
    the restoring part includes at least four spring elements,
    the at least four spring elements are arranged between the base part and the support part and at a distance from a central vertical axis, and
    the distance between the at least four spring elements can be varied by radially offsetting at least two of the at least four spring elements inwardly and outwardly with respect to the central vertical axis.

2. The board apparatus according to claim 1, wherein the at least four spring elements are elastomeric springs.

3. The board apparatus according to claim 2, wherein the elastomeric springs are slipped onto spring holders.

4. The board apparatus according to claim 2, wherein the elastomeric springs are produced from one of, chloroprene rubber or polyurethane.

5. The board apparatus according to claim 2, wherein the elastomeric springs have a height of between approximately 40 mm and 60 mm.

6. The board apparatus according to claim 1, wherein the at least four spring elements can be radially offset parallel to at least one of, a longitudinal axis and a transverse axis.

7. The board apparatus according to claim 1, wherein the at least four spring elements are each shifted in the base part.

8. The board apparatus according to claim 1, wherein all of the at least four spring elements can be radially offset simultaneously by an adjusting apparatus.

9. The board apparatus according to claim 8, wherein the adjusting apparatus is a rotatable adjusting disk having circular eccentric elongated holes.

10. The board apparatus according to claim 1, further comprising a sensor configured to sense weight displacements of the user's body.

11. The board apparatus according to claim 1, wherein
    the support part is movable vertically along a vertical axis; and
    the restoring part is configured to generate a restoring force that counteracts a vertical motion of the support part.

12. The board apparatus according to claim 11, further comprising a sensor configured to sense vertical accelerations of the user's body.

13. The board apparatus according to claim 1, wherein
    the support part is rotatable around a vertical axis; and
    the restoring part is configured to generate a restoring force that counteracts a rotation of the support part.

14. The board apparatus according to claim 13, wherein the support part is rotatable 360° clockwise and counter-clockwise.

15. The board apparatus according to claim 13, wherein
    the restoring part generates the restoring force that returns the support part, when twisted, to an initial position; and
    the restoring force reaches its maximum when the support part is twisted half a revolution clockwise or counter-clockwise out of the initial position.

16. The board apparatus according to claim 15, wherein the restoring part further includes:
    a carrier plate connected nonrotatably to the platform; and
    at least one further spring which generates the restoring force that returns the support part and which engages against a circumferential surface of the carrier plate.

17. The board apparatus according to claim 16, wherein the carrier plate has a symmetrical oval shape.

18. The board apparatus according to claim 17, wherein the symmetrical oval shape of the carrier plate has an indentation at at least one vertex of the oval shape.

19. The board apparatus according to claim 16, wherein the carrier plate has an elliptical shape.

20. The board apparatus according to claim 19, wherein the elliptical shape of the carrier plate has an indentation at two vertices.

21. The board apparatus according to claim 16, wherein the restoring part further includes a ball bearing in rolling contact against the circumferential surface of the carrier plate.

22. The board apparatus according to claim 21, wherein, when the support part is in the initial position, the ball bearing rests in an indentation in the circumferential surface of the carrier plate.

23. The board apparatus according to claim 13, wherein
    the restoring part generates the restoring force that returns the support part, when twisted, to one of two initial positions that are located 180° opposite to one another; and
    the restoring force reaches its maximum when the support part is rotated one-quarter revolution clockwise or counter-clockwise out of the two initial positions.

24. The board apparatus according to claim 13, wherein the restoring force that counteracts the rotation of the support part is adjustable.

25. The board apparatus according to claim 13, wherein the support part further includes a sensor configured to sense rotational motions of the user.

26. The board apparatus according to claim 1, wherein a button unit having at least two movable buttons is provided on the platform of the support part.

27. The board apparatus according to claim 26, wherein, upon actuation of the at least two movable buttons, a signal is triggered when a top surface of the at least two movable buttons is located below a top surface of the platform.

28. The board apparatus according to claim 1, wherein at least two of the at least four spring elements can be radially offset inwardly and outwardly in the direction of one of a longitudinal axis or a transverse axis.

29. A board apparatus for balance exercises and balance games of a user, comprising:
   a base part,
   a support part for the user's body, said support part including a platform which is tiltable relative to the base part, and
   a restoring part configured to generate a restoring force that counteracts a tilt of the support part,
   wherein
      the restoring part includes at least four spring elements,
      the at least four spring elements are arranged between the base part and the support part and at a distance from a central vertical axis, and
      the distance between the at least four spring elements can be varied by radially offsetting at least two of the at least four spring elements inwardly and outwardly with respect to the central vertical axis,
   wherein the support part and the base part are connected by way of the at least four spring elements.

30. A board apparatus for balance exercises and balance games of a user, comprising:
   a base part,
   a support part for the user's body, said support part including a platform which is tiltable relative to the base part, and
   a restoring part configured to generate a restoring force that counteracts a tilt of the support part,
   wherein
      the restoring part includes at least four spring elements,
      the at least four spring elements are arranged between the base part and the support part and at a distance from a central vertical axis, and
      the distance between the at least four spring elements can be varied by radially offsetting at least two of the at least four spring elements inwardly and outwardly with respect to the central vertical axis; and
   wherein the restoring part further includes:
      a carrier plate having a symmetrical oval shape connected nonrotatably to the platform.

* * * * *